United States Patent
Nishimoto et al.

(10) Patent No.: US 9,448,458 B2
(45) Date of Patent: Sep. 20, 2016

(54) OPTICAL COMMUNICATION DEVICE AND METHOD OF CONTROLLING OPTICAL MODULATOR

(71) Applicant: Fujitsu Optical Components Limited, Kawasaki-shi, Kanagawa (JP)

(72) Inventors: Hiroshi Nishimoto, Sagamihara (JP); Akihiro Toya, Kawasaki (JP)

(73) Assignee: FUJITSU OPTICAL COMPONENTS LIMITED, Kawasaki (JP)

(*) Notice: Subject to any disclaimer, the term of this patent is extended or adjusted under 35 U.S.C. 154(b) by 0 days.

(21) Appl. No.: 14/950,198

(22) Filed: Nov. 24, 2015

(65) Prior Publication Data

US 2016/0147129 A1    May 26, 2016

(30) Foreign Application Priority Data

Nov. 26, 2014   (JP) .................. 2014-239142

(51) Int. Cl.
| | |
|---|---|
| G02F 1/035 | (2006.01) |
| G02F 1/225 | (2006.01) |
| G02F 1/01 | (2006.01) |
| G02F 1/21 | (2006.01) |

(52) U.S. Cl.
CPC ........... *G02F 1/2255* (2013.01); *G02F 1/0123* (2013.01); *G02F 1/2257* (2013.01); *G02F 2001/212* (2013.01)

(58) Field of Classification Search
CPC .. G02F 1/2255; G02F 1/0123; G02F 1/2257; G02F 2001/212; G02F 1/01; G02B 6/2935; H04B 10/50572; H04B 10/50577
USPC .................................................. 385/2, 3, 8
See application file for complete search history.

(56) References Cited

U.S. PATENT DOCUMENTS

| | | |
|---|---|---|
| 2005/0254743 A1 | 11/2005 | Akiyama et al. |
| 2012/0128289 A1* | 5/2012 | Kuwahara ............. G02F 1/2257 385/2 |

(Continued)

FOREIGN PATENT DOCUMENTS

| | | |
|---|---|---|
| JP | 2005-326548 | 11/2005 |
| JP | 2012-257164 | 12/2012 |

OTHER PUBLICATIONS

J-PlatPat Abstract, Publication No. 2005-326548, Published Nov. 24, 2005.

(Continued)

*Primary Examiner* — Ellen Kim
(74) *Attorney, Agent, or Firm* — Staas & Halsey LLP

(57) ABSTRACT

An optical communication device has a pair of Mach-Zehnder optical modulators; a voltage monitor configured to monitor a voltage component acquired by optical-to-electric conversion of combined light output from the Mach-Zehnder optical modulators; a power monitor configured to monitor a power component acquired by square law detection of the optical-to-electric converted combined light from the Mach-Zehnder optical modulators; a first controller configured to control a substrate bias voltage or a driving amplitude applied to one of two waveguides of each of the Mach-Zehnder optical modulators based upon an output of the power monitor, and a second controller configured to control the substrate bias voltage or the driving amplitude applied to the other of the two waveguides of each of the Mach-Zehnder optical modulator based upon an output of the voltage monitor.

8 Claims, 14 Drawing Sheets

(56) References Cited

U.S. PATENT DOCUMENTS

| | | | |
|---|---|---|---|
| 2012/0162656 A1* | 6/2012 | Kawanishi | G02B 6/29355 356/450 |
| 2013/0051723 A1* | 2/2013 | Sudo | G02F 1/0123 385/3 |
| 2015/0280832 A1* | 10/2015 | Fujikata | H04B 10/5561 398/25 |
| 2016/0065310 A1* | 3/2016 | Toya | H04B 10/564 398/183 |

OTHER PUBLICATIONS

J-PlatPat Abstract, Publication No. 2012-257164, Published Dec. 27, 2012.

* cited by examiner

LIGHT WAVES WITH DIFFERENT
MODULATION FACTORS
BETWEEN WAVEGUIDES A AND B

LIGHT WAVES WITH SAME
MODULATION FACTOR
BETWEEN WAVEGUIDES A AND B

LIGHT WAVES WITH SAME MODULATION FACTOR BETWEEN WAVEGUIDES A AND B

LIGHT WAVES WITH DIFFERENT MODULATION FACTORS BETWEEN WAVEGUIDES A AND B

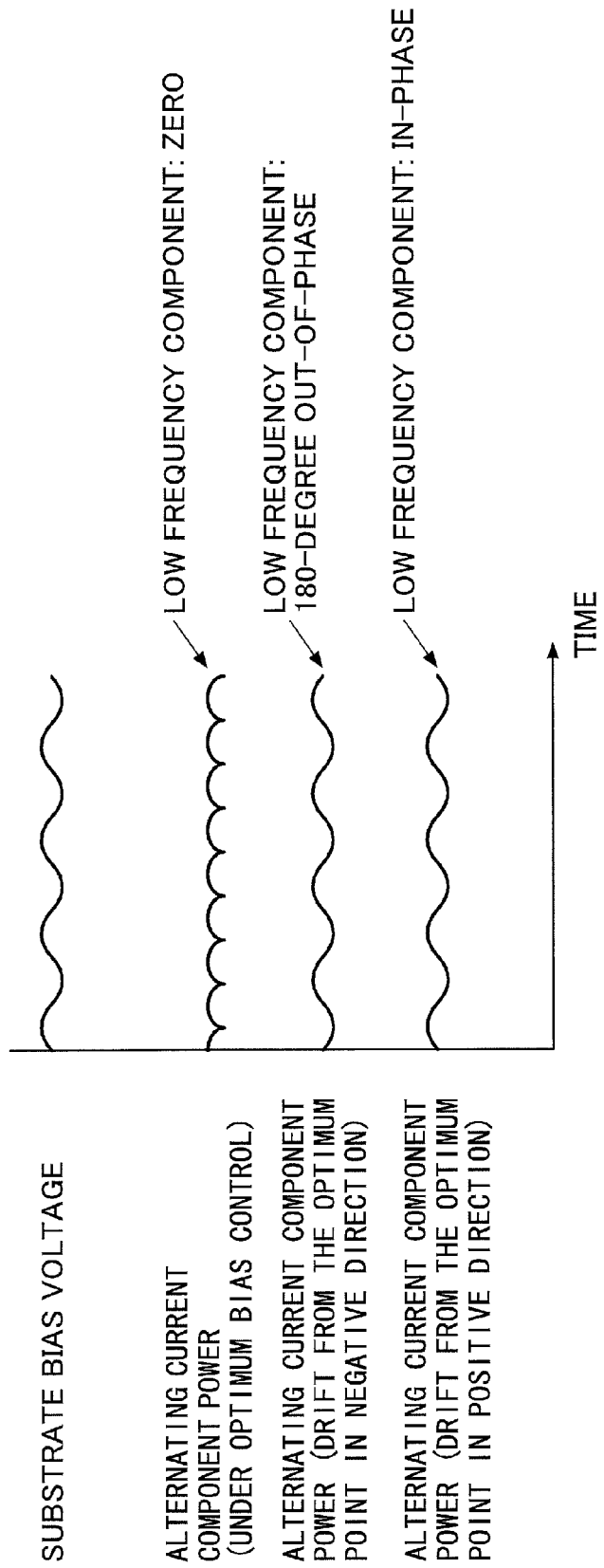

MODULATION INDEX < 100%

MODULATION INDEX > 100%

MODULATION INDEX = 100%
LENGTH OF THE COMPOSITE VECTOR IS THE MAXIMUM
⇒ OUTPUT POWER LEVEL IS THE MAXIMUM

OPTICAL COMMUNICATION DEVICE AND METHOD OF CONTROLLING OPTICAL MODULATOR

CROSS-REFERENCE TO RELATED APPLICATIONS

This application is based upon and claims the benefit of priority of Japanese Patent Application No. 2014-239142 filed on Nov. 26, 2014, which is incorporated herein by references in its entirety.

FIELD

The disclosures herein relate to an optical communication device and a control method for an optical modulator.

BACKGROUND

In recent years, 100 Gigabit-per-second (Gbps) long-distance optical transmission has been implemented by dual-polarization quadrature phase-shift keying (DP-QPSK) using a digital coherent technology. To further improve transmission capacity, greater-level modulation schemes such as polarization division multiplexed 16 quadrature amplitude modulation (16-QAM) are being developed. Demand for downsizing optical transceivers is also increasing. At present, lithium-niobate ($LiNbO_3$) Mach-Zehnder modulators are used typically as optical modulators. In order to realize downsized DP-QPSK or DP-16QAM transmitters, semiconductor Mach-Zehnder modulators are desired.

There is an intrinsic problem in semiconductor optical modulators in that the modulation characteristic (i.e., the relationship between applied voltage and amount of phase rotation, or the voltage-to-phase change characteristic) varies depending on the wavelength of a light beam input to the modulator. In semiconductor optical modulators, the absorption edge wavelength of the semiconductor material changes according to applied voltage, and the phase of light is modulated making use of the phase shift due to absorption based on Kramers-Kronig relations. Hence, semiconductor optical modulators have wavelength dependency such that the closer to the absorption-edge-wavelength the light to be modulated is, the greater the optical phase change with respect to the voltage change becomes.

On the other hand, because the absorption edge wavelength of a semiconductor optical modulator changes in response to a change in the substrate bias voltage, the modulation characteristic can be controlled. In this context, a "substrate bias voltage" is a direct-current (DC) bias voltage for controlling a modulator operating point (which voltage corresponds to a center voltage of a high-frequency electric signal for driving the optical modulator). The substrate bias voltage is distinguished from other types of bias voltages. Other types of bias voltages include an optical phase bias voltage for controlling a phase difference of light propagating through the two optical waveguides of a Mach-Zehnder interferometer, and a $\pi/2$ shift bias voltage for controlling the optical phase difference between two Mach-Zehnder interferometers to $\pi/2$ radians when performing orthogonal phase shift keying.

To address the wavelength dependency of the modulation characteristic of semiconductor optical modulators, several techniques for controlling a substrate bias voltage or amplitude of a drive signal according to the wavelength of input light are proposed. The first technique is to set the substrate bias voltage to a predetermined level according to the wavelength, and drive the modulator at a constant amplitude of a drive signal regardless of the wavelength. See, for example, Japanese Laid-open Patent Publication No. 2005-326548 A.

The second technique is to perform feedback control on the substrate bias voltage or drive signal amplitude. A low frequency signal is superimposed on driving data signals, and output light signals are monitored. Responsive to the monitoring result, the substrate bias voltage and/or the amplitude of the modulator drive signal is controlled. See, for example, Japanese Laid-open Patent Publication No. 2012-257164 A.

In semiconductor Mach-Zehnder modulators, the voltage-to-phase change characteristic (i.e., modulation characteristic) or the wavelength characteristic may vary between the two optical waveguides of the Mach-Zehnder interferometer. The two optical waveguides may undergo different changes with time in terms of the voltage-to-phase change characteristic. In addition, driving circuits (or driving amplitudes) for driving the optical waveguides may also be subjected to different changes with time. Even with a $LiNbO_3$ Mach-Zehnder modulator that performs optical phase modulation making use of electrooptic effect, modulation amplitude may vary between the two optical waveguides of the interferometer, due to change with time in driving amplitude.

The conventional first and second techniques drive the two optical waveguides of the Mach-Zehnder interferometer using a driving waveform with the same amplitude and they apply the same substrate bias voltage to the two optical waveguides. Accordingly, when the voltage-to-phase change characteristic or driving amplitude varies between the two optical waveguides, or when the two optical waveguides undergo different changes with time, then the optical modulator is offset from the optimum modulation condition.

Accordingly, it is desired to provide an optical communication device and a technique for controlling an optical modulator that can maintain the optimum modulation condition even if the modulation characteristic varies between two optical waveguides of a Mach-Zehnder interferometer or the two optical waveguides undergo different changes in terms of the modulation characteristic.

SUMMARY

According to an aspect of the disclosures, an optical communication device has a pair of Mach-Zehnder optical modulators;

a voltage monitor configured to monitor a voltage component acquired by optical-to-electric conversion of combined light output from the Mach-Zehnder optical modulators;

a power monitor configured to monitor a power component acquired by square law detection of the optical-to-electric converted combined light from the Mach-Zehnder optical modulators;

a first controller configured to control a substrate bias voltage or a driving amplitude applied to one of two waveguides of each of the Mach-Zehnder optical modulators so as to minimize an alternating current component in the combined light based upon a monitoring result of the power monitor, and a second controller configured to control the substrate bias voltage or the driving amplitude applied to the other of the two waveguides of each of the Mach-Zehnder optical modulators so as to maximize intensity of the combined light based upon a monitoring result of the voltage monitor.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

BRIEF DESCRIPTION OF DRAWINGS

FIG. 4A and FIG. 4B are diagram to explain (nonlinear) power monitoring and control for bringing the modulation indexes of the waveguides to be consistent with each other;

DESCRIPTION OF EMBODIMENTS

Figure 1:
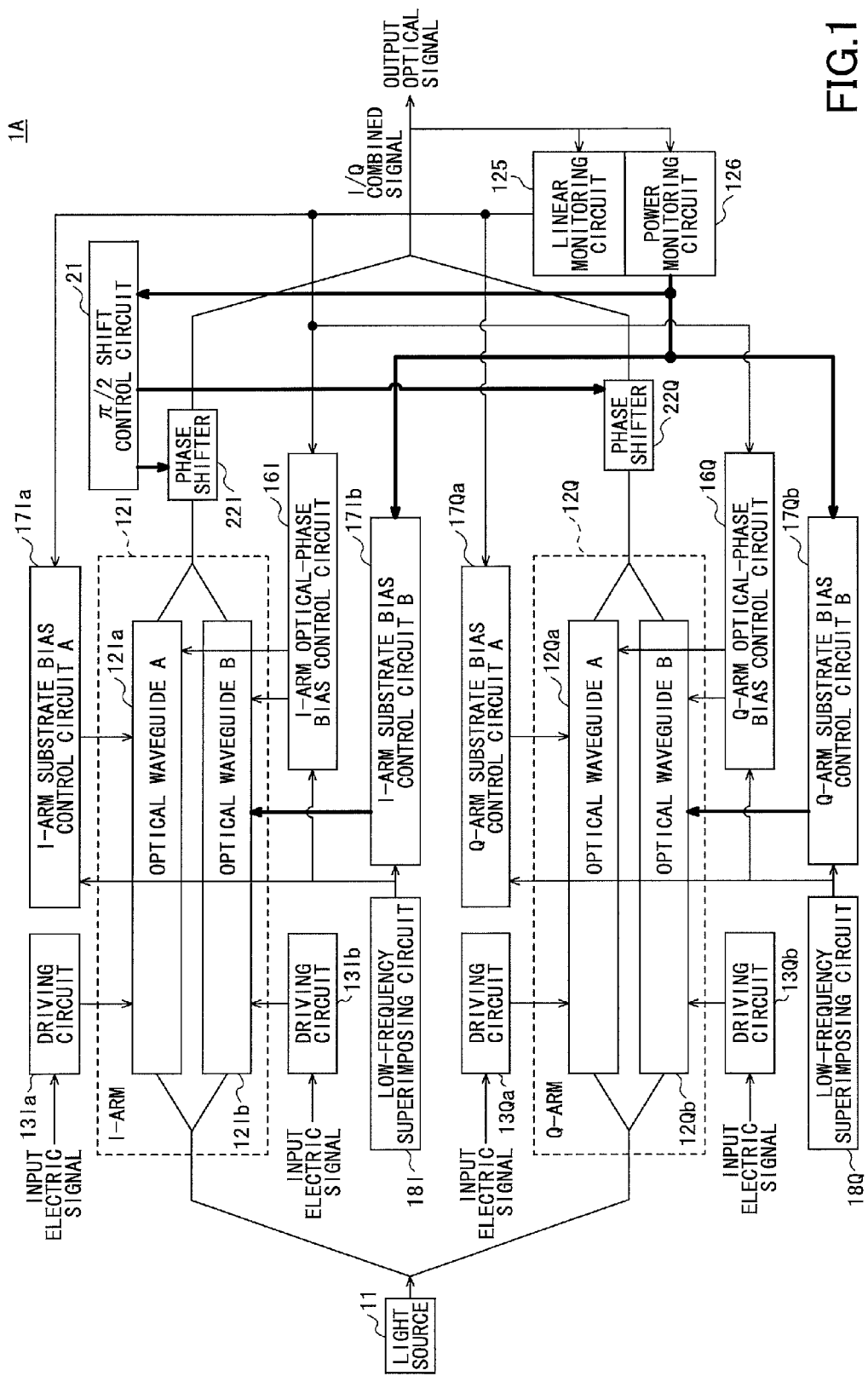
FIG. 1 is a schematic diagram of an optical transmitter according to the first embodiment of the invention.

In the embodiments, two waveguides of a Mach-Zehnder interferometer of an optical modulator are controlled independently so as to minimize a variation in modulation efficiency between the waveguides and maximize the phase modulation index (achieving a 100% phase shift of n radians). The two waveguides of the Mach-Zehnder interferometer are labeled as "optical waveguide A" and "optical waveguide B" for the explanation purpose. Control operations for the two waveguides are performed as follows.

(1) Power monitoring and control is performed on the substrate bias voltage or driving amplitude applied to optical waveguide B so as to cause the modulation index (phase rotation) of optical waveguide B to conform with that of optical waveguide A. In the power monitoring and control, power of combined light from an I-arm (in-phase) optical modulator and a Q-arm (quadrature) optical modulator is detected (square law detection of a voltage). Then the substrate bias voltage or the driving amplitude applied to optical waveguide B is controlled so as to minimize an alternating current (AC) component representing variation in the I/Q combined light. This control scheme is to bring the modulation index of optical waveguide B to be consistent with the modulation index of optical waveguide A.

(2) Voltage monitoring and control is performed on the substrate bias voltage or driving amplitude applied to optical waveguide A such that the modulation index (or the phase rotation) represents 100% phase shift of n radians. In the voltage monitoring and control, a voltage level of the I/Q combined light is detected, and the substrate bias voltage or the driving amplitude applied to optical waveguide A is controlled so as to maximize the voltage level (intensity) of the I/Q combined light. Since the relationship between the intensity of the I/Q combined light and the detected electric current (i.e., the detected voltage) is linear, the voltage monitoring and control may be called "linear monitoring and control". This control scheme is to bring the modulation index of the optical modulator to 100%.

By performing the above-described control schemes (1) and (2), the phase modulation indexes of optical waveguide A and optical waveguide B are controlled to be 100%. To carry out the power monitoring of an alternating current component in the output power of the optical modulator (control scheme (1)) and the linear monitoring of the intensity (voltage) of output light from the optical modulator (control scheme (2)), a low-frequency signal is superimposed on the substrate bias voltage or the drive signal for the optical modulator. A low-frequency component contained in the I-Q combined light is synchronously detected. By controlling the substrate bias voltage or the driving amplitude so as to minimize the detected low-frequency component, the alternating current component of the I/Q combined light becomes the minimum, and the intensity of the I/Q combined light becomes the maximum (with the modulation index of 100%).

Superimposing the low-frequency signal on the drive signal or the substrate bias voltage and controlling the driving amplitude or the substrate bias voltage can be combined arbitrarily, and four combinations are available.

First Embodiment

FIG. 1 is a schematic diagram of a QPSK optical transmitter 1A, which is an example of an optical communication device according to the first embodiment. In the first embodiment, a low-frequency signal is superimposed on a substrate bias voltage to control the substrate bias voltage according to the control schemes (1) and (2).

The optical transmitter 1A has a light source 11, a pair of Mach-Zehnder optical modulators 12I and 12Q arranged in parallel, and phase shifters 22I and 22Q. The Mach-Zehnder optical modulator 12I may be referred to as an "I-arm modulator" or simply as an "I-arm". The Mach-Zehnder optical modulator 12Q may be referred to as a "Q-arm modulator" or simply as a "Q-arm". The I-arm modulator 12I and the Q-arm modulator 12Q are semiconductor optical modulators using, for example, indium phosphide (InP). The absorption edge wavelength of the semiconductor changes according to the applied voltage. The phase of light is modulated making use of phase change due to the absorption according to the Kramers-Kronig relation. The I-arm modulator 12I, the Q-arm modulator 12Q, and the phase shifters 22I and 22Q form an optical modulation block.

The light source 11 is, for example, a wavelength-tunable semiconductor laser suitable for use in wavelength division multiplexing (WDM) transmission systems. The light emitted from the light source 11 is split into two paths and guided to the I-arm modulator 12I and the Q-arm modulator 12Q of a modulation block. In the I-arm modulator 12I, the input light is split into two paths and guided to waveguide 12Ia (optical waveguide A) and waveguide 12Ib (optical waveguide B). Similarly, in the Q-arm modulator 12Q, the input light is split into two paths and guided to waveguide 12Qa (optical waveguide A) and waveguide 12Qb (optical waveguide B). A phase difference of $\pi/2$ radians is given between the light beams propagating through the I-modulator 12I and the Q-modulator 12Q by means of the phase shifters 22I and 22Q. The two light beams with the $\pi/2$ (90-degree) phase difference are combined and output as I/Q combined light from the optical modulation block.

The optical transmitter 1A also has a linear monitoring circuit 125 and a power monitoring circuit 126. The linear monitoring circuit 125 monitors a voltage level of the I/Q combined light output from the optical modulation block. The power monitoring circuit 126 monitors a square-law detected power component. Photodetectors may be provided to the linear monitoring circuit 125 and the power monitoring circuit 126, respectively. Or a shared photodetector may be placed near the branching point of the monitored light from the I/Q combined light.

The output of the power monitoring circuit 126 is connected to an input of the I-arm substrate bias control circuit 17Ib and an input of the Q-arm substrate bias control circuit 17Qb. The I-arm substrate bias control circuit 17Ib controls a substrate bias voltage applied to one of two waveguides, e.g., the waveguide 12Ib (optical waveguide B) of the I-arm modulator 12I. The Q-arm substrate control circuit 17Qb controls a substrate bias voltage applied to one of two waveguides, e.g., waveguide 12Qb (optical waveguide B) of the Q-arm modulator 12Q. The output of the power monitoring circuit 126 is also connected to input of a $\pi/2$ shift control circuit 21 that controls a phase difference between the I-arm and the Q-arm.

The output of the linear monitoring circuit 125 is connected to an input of the I-arm substrate bias control circuit 17Ia and an input of the Q-arm substrate bias control circuit 17Qa. The I-arm substrate bias control circuit 17Ia controls a substrate bias voltage applied to the other waveguide 12Ia (optical waveguide A) of the I-arm modulator 12I. The Q-arm substrate control circuit 17Qa controls a substrate bias voltage applied to the other waveguide 12Qa (optical waveguide A) of the Q-arm modulator 12Q. In the I-arm modulator 12I and the Q-arm modulator 12Q, the substrate bias voltages for the two waveguides (optical waveguide A and optical waveguide B) are controlled independently.

The output of the linear monitoring circuit 125 is also connected to an input of an I-arm optical-phase bias control circuit 16I and an input of a Q-arm optical-phase bias control circuit 16Q. The I-arm optical-phase control circuit 16I adjusts the phase difference between the light beams modulated by the two waveguides of the I-arm modulator 12I. The Q-arm optical-phase bias control circuit 16Q adjusts the phase difference between the light beams modulated by the two waveguides of the Q-arm modulator 12Q.

A pair of signal electrodes and a pair of bias electrodes are provided to each of the optical waveguides A (labelled as 12Ia and 12Qa) and optical waveguides B (labelled as 12Ib and 12Qb) along the light travelling direction. These electrodes are omitted in the figure for the purpose of simplification of the drawing. The signal electrodes are progressive wave type electrodes, to which high-frequency (e.g., 32 Gbps) electric signals are applied by driving circuits 13Ia, 13Ib, 13Qa and 13Qb (which may be collectively referred to as "driving circuits 13") to modulates propagating light at a high frequency. The driving circuits 13 and the corresponding signal electrodes are connected by AC-coupled connection.

A substrate bias voltage is applied to the signal electrode of the waveguide 12Ia (optical waveguide A) of the I-arm modulator 12I in a DC manner by the I-arm bias control circuit 17Ia. A substrate bias voltage is applied to the signal electrode of the waveguide 12Ib (optical waveguide B) of the I-arm modulator 12I in a DC manner by the I-arm bias control circuit 17Ib. Similarly, a substrate bias voltage is applied to the signal electrode of the waveguide 12Qa (optical waveguide A) of the Q-arm modulator 12Q in a DC manner by the Q-arm bias control circuit 17Qa. A substrate bias voltage is applied to the signal electrode of the waveguide 12Qb (optical waveguide B) of the Q-arm modulator 12Q in a DC manner by the Q-arm bias control circuit 17Qb. The substrate bias voltage determines the modulation point, that is, the DC center voltage of the driving amplitude.

Data signals with opposite polarities are applied to the signal electrodes of the waveguides 12Ia and 12Ib of the I-arm modulator 12I and the phases of the light beams are modulated at opposite polarities. The combined light beams that have undergone phase modulation at opposite polarities become an output of the I-arm modulator 12I, which output is binary phase-modulated light with 0 and $\pi$ binary phase shifts. Similarly, data signals with opposite polarities are applied to the signal electrodes of the waveguides 12Qa and 12Qb of the Q-arm modulator 12Q and the phases of the light beams are modulated at opposite polarities. The combined light beams that have undergone phase modulation at opposite polarities become an output of the Q-arm modulator 12Q, which output is binary phase-modulated light with 0 and $\pi$ binary phase shifts.

A 90-degree ($\pi/2$) phase difference is added between the output lights of the I-arm modulator 12I and the Q-arm modulator 12Q. The combined light of the I-arm output and the Q-arm output with the $\pi/2$ phase difference is a QPSK light signal. Although the first embodiment is explained using an example of QPSK, the invention is applicable to other multi-level modulation schemes. For example, by supplying electric signals with different amplitude levels to the driving circuits 13, the output light of the optical modulation block becomes a multilevel-modulated signal such as a 16QAM signal with different amplitude levels and 0 and $\pi$ binary phase shifts.

On the I-arm side, a low-frequency superimposing circuit 18I generates a signal whose frequency is sufficiently low (for example, several kilohertz) compared with the drive signal frequency, and supplies the low frequency signal to the I-arm substrate bias control circuits 17Ia and 17Ib. The low-frequency signal is superimposed on the substrate bias voltages, which voltages are independently applied to the waveguide 12Ia and the waveguide 12Ib. The low-frequency signal is also supplied to I-arm optical-phase bias control circuit 16I, and superimposed on the I-arm optical-phase bias voltage. Similarly, on the Q-arm side, a low-frequency superimposing circuit 18Q generates a low-frequency signal and supplies the low-frequency signal to the Q-arm substrate bias control circuits 17Qa and 17Qb. The low-frequency signal is superimposed on the substrate bias voltages, which voltages are independently applied to the waveguide 12Qa and the waveguide 12Qb. The low-frequency signal is also supplied to Q-arm optical-phase bias control circuit 16Q, and superimposed on the Q-arm optical-phase bias voltage.

The linear monitoring circuit 125 receives a portion of the I/Q combined light. The monitored light component is converted into a voltage by the photodetector and an electronic circuit. The output of the linear monitoring circuit 125 is supplied to the I-arm substrate bias control circuit 17Ia and the Q-arm substrate bias control circuit 17Qa. The I-arm substrate bias control circuit 17Ia and the Q-arm substrate bias control circuit 17Qa carry out synchronous detection of the low-frequency component contained in the monitored voltage using the low-frequency signals, respectively. The I-arm substrate bias control circuit 17Ia and the Q-arm substrate bias control circuit 17Qa control the substrate bias voltages applied to the associated optical waveguides A so as to decrease the detected low-frequency component to or near zero.

The power monitoring circuit 126 receives a portion of the I/Q combined light. The monitored light component is converted to a voltage by the photodetector and an electronic circuit, and a power component of the monitored light is detected (square-law detection of the voltage). The power monitoring circuit 126 has a certain range (e.g., several hundred MHz) of bandwidth in order to acquire an alternating current component. The output of the power monitoring circuit 126 is supplied to the I-arm substrate bias control circuit 17Ib and the Q-arm substrate bias control circuit 17Qb, which circuits are configured to control the substrate bias voltages applied to the associated optical waveguides B. The I-arm substrate bias control circuit 17Ib and the Q-arm substrate bias control circuit 17Qb carry out synchronous detection of the low-frequency component contained in the monitored voltage using the low-frequency signals, respectively, and control the substrate bias voltages for the associated optical waveguides A so as to decrease the detected low-frequency component to or near zero.

<Substrate Bias Control for Optical Waveguide B>

The substrate bias voltage of optical waveguide B is controlled so as to minimize the alternating current component in the combined light of the outputs from the I-arm modulator 12I and the Q-arm modulator 12Q (Control scheme (1)). Under this control, the modulation index of optical waveguide B conforms with the modulation index of optical waveguide A.

At the operation point with the minimum alternating current component in the I/Q combined light, the low frequency signal is folded back and it becomes a component with twice the superimposed low frequency. According, the low-frequency component contained in the I/Q combined light becomes zero. When the operating point shifts from the optimum point, a low-frequency component is detected. Depending on the direction of the shifting, the polarity of the low-frequency component is inverted. Accordingly, the direction of control for the substrate bias voltage can be known. Details of the control operation (1) are described below. The substrate bias control for optical waveguide B may be performed either by an electronic analog circuit or digital signal processing.

<Substrate Bias Control for Optical Waveguide A>

The substrate bias voltage of optical waveguide A is controlled so as to maximize the power level (e.g., the average power) of the output light from the modulator 12 (control scheme (2)).

At the operating point with the maximum power level (or intensity) of the modulated light, the low frequency signal is folded back and it becomes a component with twice the output frequency. According, the low-frequency component contained in the I/Q combined light becomes zero. When the operating point shifts from the optimum point, a low-frequency component is detected. Depending on the direction of the shifting, the polarity of the low-frequency component is inverted. Accordingly, the direction of control for the substrate bias voltage can be known. Details of control operation (2) are described below. The substrate bias control for optical waveguide A may be performed either by an electronic analogue circuit or digital signal processing.

By independently performing control operations on the substrate bias voltages of optical waveguide A and optical waveguide B, the modulation indexes of the two waveguides are consistent with each other even if the voltage-to-phase change characteristic varies between optical waveguide A and optical waveguide B, or even if the two waveguides undergo different changes with time (control scheme (1). In addition, both optical waveguide A and optical waveguide B achieve 100% modulation index with 100% phase shift of $\pi$ radians (control scheme (2)). The relation of the control rate for optical waveguide A and the control rate for optical waveguide B is, for example, B>A or A>B.

<Basic Ideas of Control Schemes>

Figure 2A:
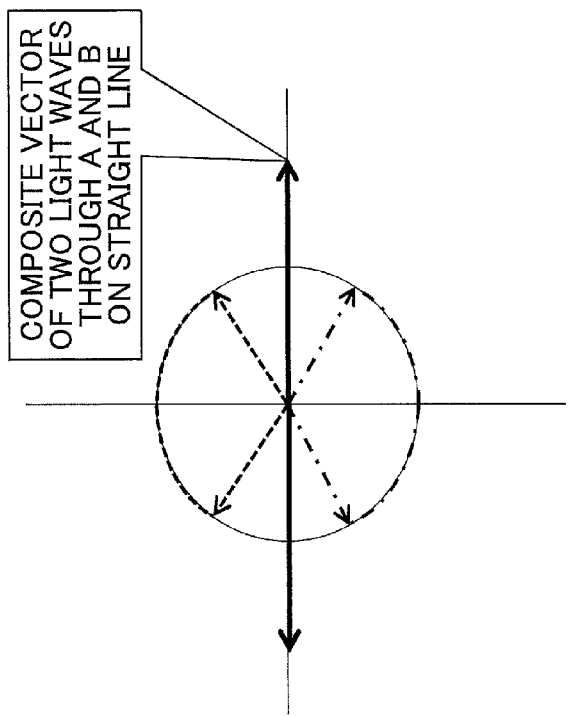
FIG. 2A and FIG. 2B illustrate a basic idea of bringing modulation indexes of a pair of waveguides of a Mach-Zehnder interferometer to be consistent with each other.

FIG. 2A through FIG. 4B illustrate basic ideas of control scheme (1) for bringing the modulation indexes of light beams travelling through the two waveguides of a Mach-Zehnder interferometer to be consistent with each other. As illustrated in FIG. 2A, if the modulation indexes of light beams differ between optical waveguide A and optical waveguide B (for example, 70% on optical waveguide A and 80% on optical waveguide B), the composite vector of the light vector on the optical waveguide A and the light vector on the optical waveguide B is not on the horizontal axis. In this case, the 0 to $\pi$ phase modulation efficiency of the Mach-Zehnder optical modulator decreases.

Figure 2B:
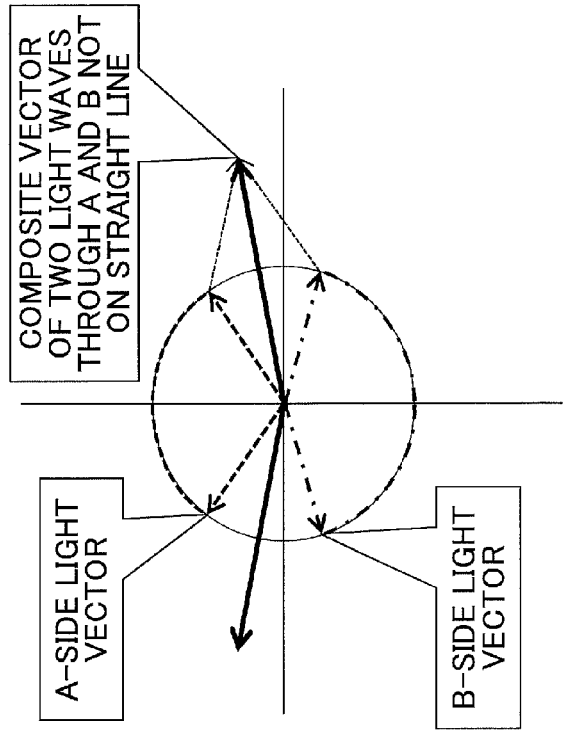

In contrast, if the modulation indexes of light beams through the two waveguides are similar to each other (for example, 60% on both waveguides) as illustrated in FIG. 2B, the composite vector of light vectors on the waveguide pair is on the horizontal axis. In this case, phase modulation between 0 radians and $\pi$ radians is correctly carried out.

Figure 3B:
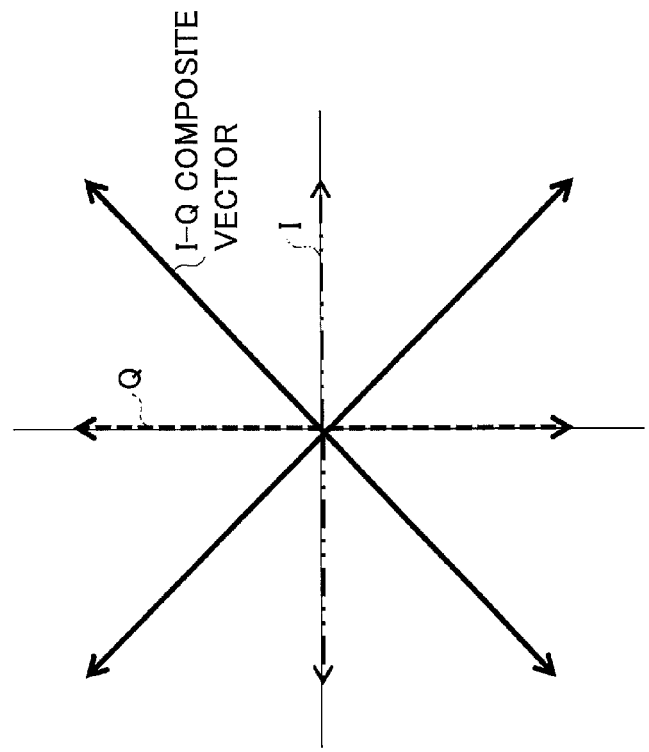
FIG. 3A and FIG. 3B illustrate a basic idea of bringing the modulation indexes of the two waveguides to be consistent with each other for quadrature phase shift keying (QPSK)
Figure 3A:
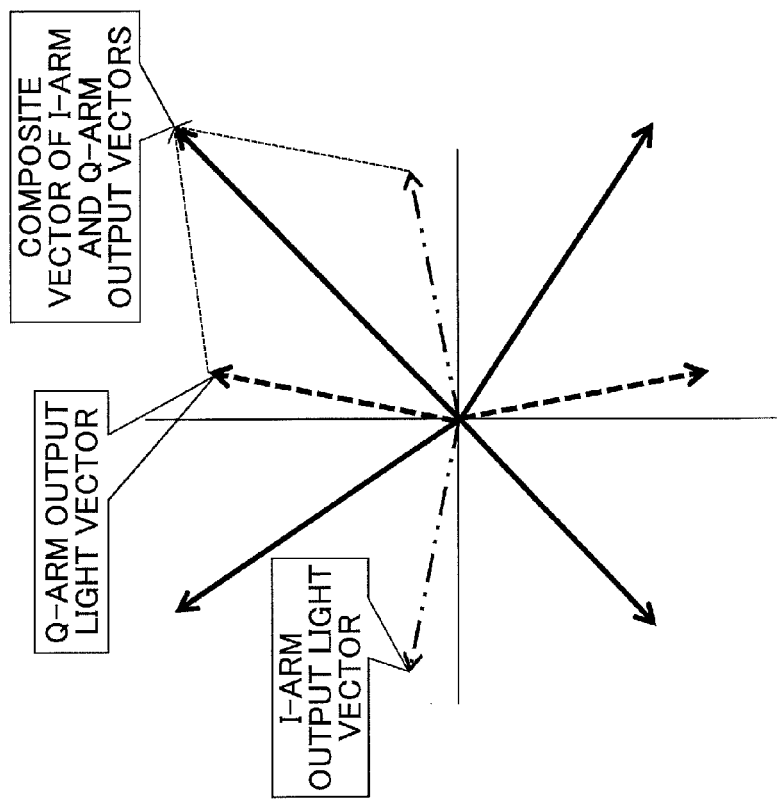

FIG. 3A and FIG. 3B illustrate the basic idea of bringing the modulation indexes of the light beams traveling through the two waveguides to be consistent with each other when using a pair of Mach-Zehnder interferometers with a quadrature phase component. As illustrated in FIG. 3A, if the modulation indexes of the light beams travelling through optical waveguide A and optical waveguide B are different from each other, the phase relation between 0 radians and $\pi$ radians varies in the I-arm, and the phase relation between $\pi/2$ radians and $3\pi/2$ radians varies in the Q-arm. As a result, the combined light of the I-arm output and the Q-arm output deviates from the points of these four phases on the signal constellation, and the light intensity (the length of the composite vector) varies between the four phase points. This situation corresponds to a case in which the amount of alternating current component contained in the I/Q combined light is greater than the minimum.

In contrast, as illustrated in FIG. 3B, if the modulation indexes of the light beams travelling through optical waveguide A and optical waveguide B are the same, orthogonality between the I-arm output light and the Q-arm output light is maintained. In the combined output light, the light intensity becomes even at the four phase points on the signal constellation. This situation corresponds to a case in which the amount of alternating current component contained in the I/Q combined light is the minimum.

Figure 4A:
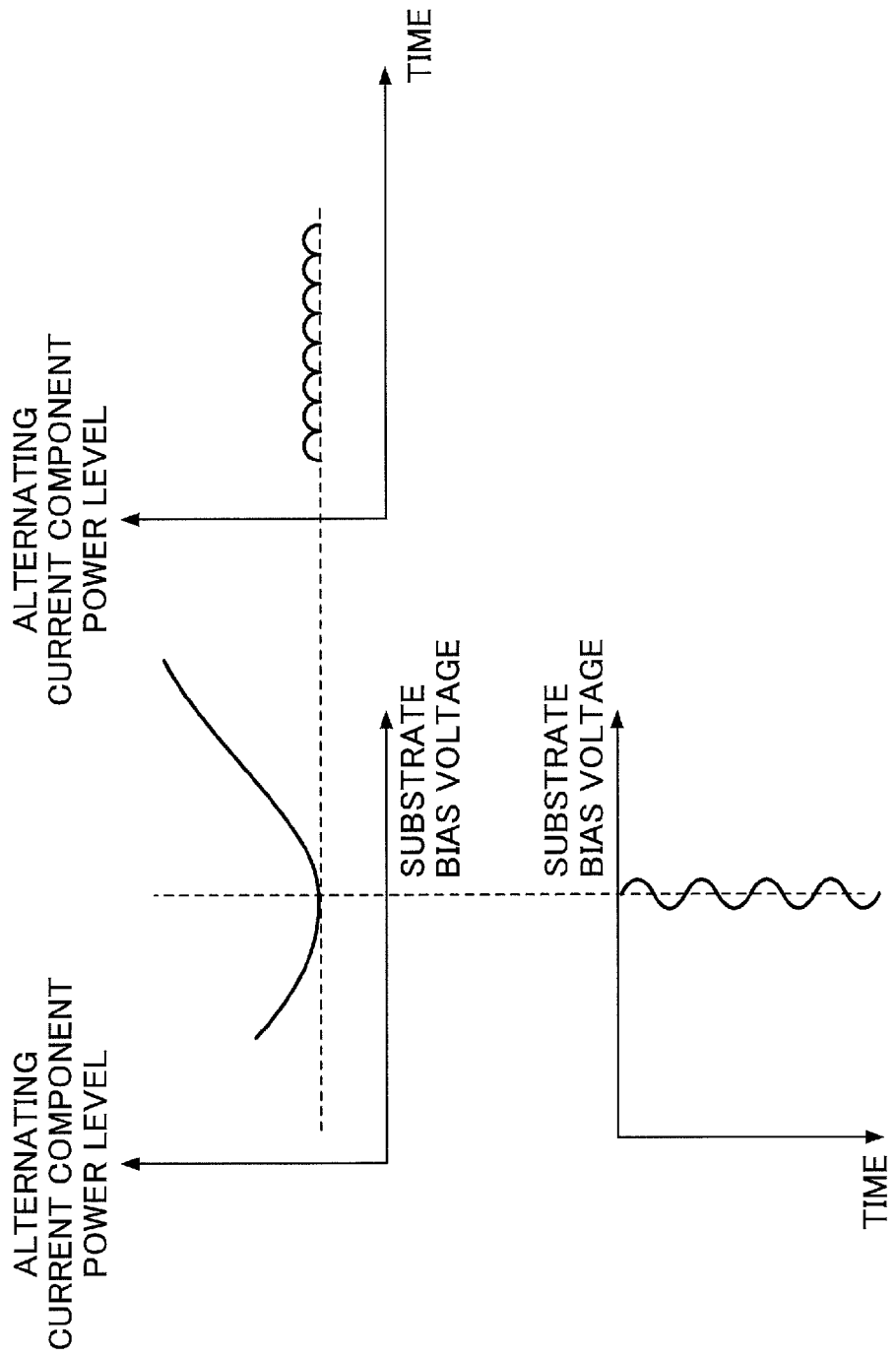

FIG. 4A and FIG. 4B are diagrams to explain the controlling for minimizing the alternating current component. When a substrate bias voltage for the optical modulator 12 is slightly modulated by a low-frequency signal, the voltage-to-phase change characteristic of the optical modulator 12 changes gently in accordance with the low frequency. Consequently, the light beam undergoes phase modulation of $\pi \pm \Delta\phi$ radians due to low frequency component added to the 0 to π phase shifts under application of high-frequency driving signals, where Δφ represents a variation in degree of phase modulation due to the low frequency modulation.

As illustrated at the top left of FIG. 4A, the alternating current power becomes the minimum at the optimum bias voltage for optical waveguide B. The waveform of the low frequency component applied to the substrate bias is folded back, and a frequency twice the superimposed low frequency is detected, while maintaining the amplitude of Δφ, as illustrated in the right-hand side of FIG. 4A. In this case, the amount of the superimposed low frequency component becomes the minimum (or zero). If the alternating current component increases, shifting from the optimum bias point to the positive side, a low frequency component in-phase with the applied low-frequency signal is detected (FIG. 4B). If the alternating current component increases, shifting from the optimum bias point to the negative side, a low frequency component 180-degree out-of-phase with the applied low frequency signal is detected (FIG. 4B).

By monitoring the alternating current component in the I/Q combined output light and controlling the substrate bias voltage (i.e., the modulation index) of optical waveguide B so as to minimize the power of the alternating current component, the maximum output power level is achieved.

Figure 5A:
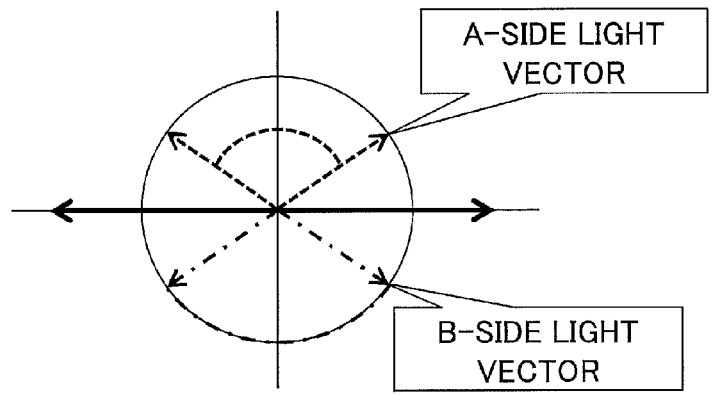
FIG. 5A through FIG. 5C illustrate a basic idea of controlling the modulation index of a Mach-Zehnder optical modulator to be 100%.

FIG. 5A through FIG. 6B illustrate basic ideas of control scheme (2) for bringing the modulation index to 100% and maximizing the output power level. In FIG. 5A through FIG. 5C, it is assumed that the modulation indexes of optical waveguide A and optical waveguide B have already been controlled so as to be consistent with each other according to control scheme (1). In FIG. 5A, the angle between the light vectors in the 0 and π phase directions on each of optical waveguides A and B is smaller than π radians and the modulation index (or depth) is less than 100% (for example, 70%). The length of the composite vector of light beams travelling through the two waveguides is shorter than the length of the composite vector acquired at 100% modulation index.

Figure 5B:
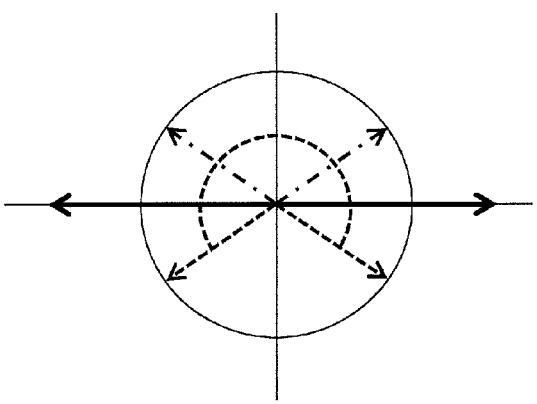

In FIG. 5B, the angle between the light vectors in the 0 and π phase directions on each of optical waveguides A and B is greater than π radians and the modulation index (or depth) is over 100% (for example 130%). The length of the composite vector of light beams traveling through the two waveguides is again shorter than that of the composite vector at 100% modulation index.

Figure 5C:
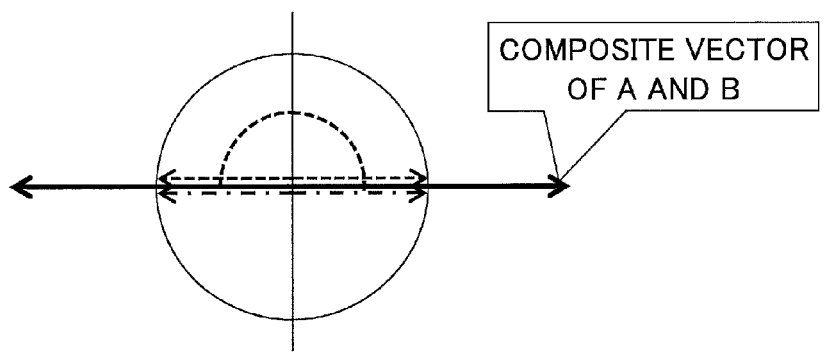

In contrast, in FIG. 5C, the light beams travelling through optical waveguides A and B undergo 0 to π phase shifts correctly. The composite vectors between waveguides A and B align with the 0 and π phase directions. The modulation index is 100% and the length of the composite vector become the maximum. This means that the output power of the optical modulator becomes the maximum.

The substrate bias voltages for optical waveguide A and optical waveguide B are controlled independently so as to minimize the alternating current component (variation between the waveguides) in the I/Q combined light and maximize the output power of the respective modulators. This approach enables stable 0 to π phase modulation and achieving 100% modulation index even if the voltage-to-phase change characteristic varies between the two waveguides of the Mach-Zehnder interferometer or even if two waveguides undergo different changes with time.

Figure 6A:
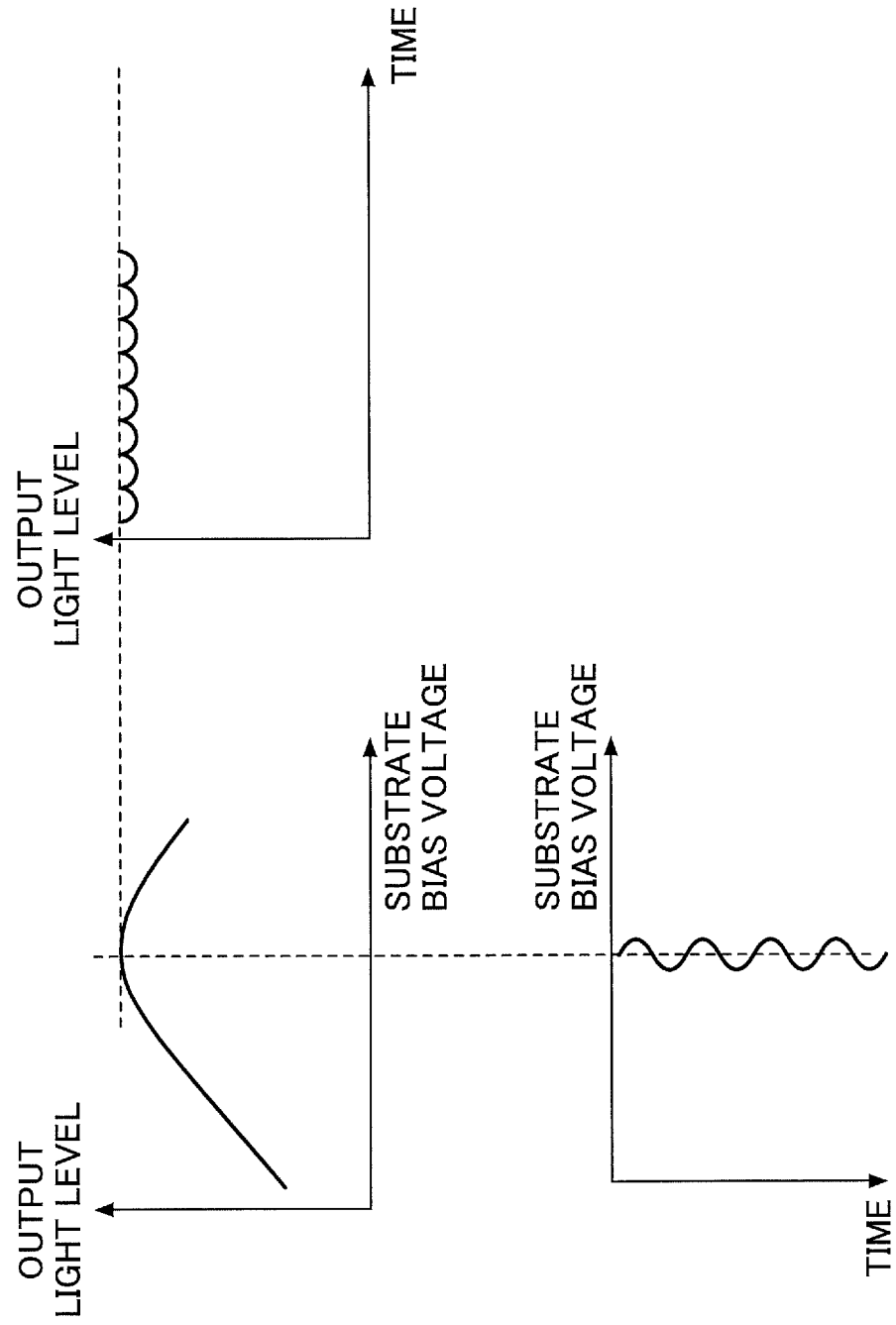
FIG. 6A and FIG. 6B illustrate (linear) voltage monitoring and control for maximizing the output power level of the optical modulator.
Figure 6B:
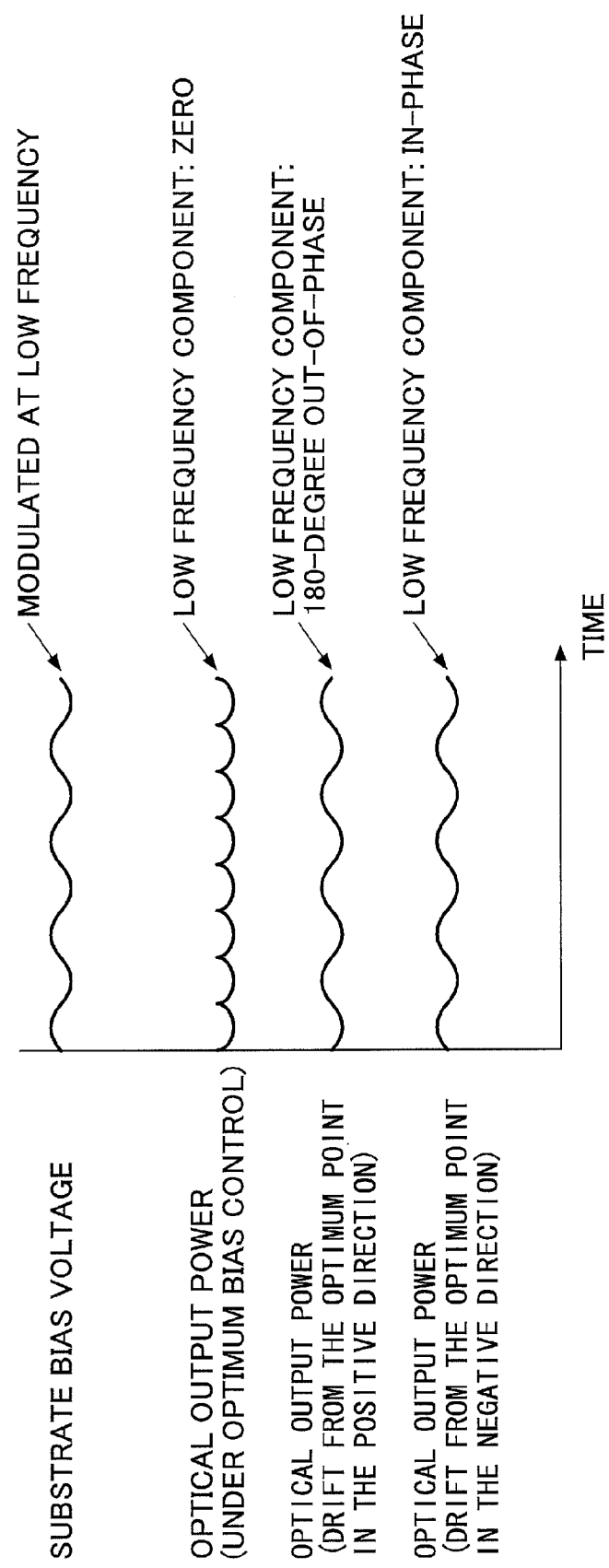

As illustrated at the top left of FIG. 6A, the output power level becomes the maximum when the substrate bias voltage for optical waveguide A is the optimum. The waveform of the low frequency component applied to the substrate bias is folded back, and a frequency twice the superimposed low frequency is detected, as illustrated at top right of FIG. 6A. Because the superimposed low frequency component is not detected, the low frequency component in the monitored signal becomes the minimum (or zero). In FIG. 6B, if the applied substrate bias voltage shifts from the optimum level to the positive side, a low frequency component 180-degree out-of-phase with the applied low frequency signal is detected. If the applied substrate bias voltage shifts from the optimum level to the negative direction, a low frequency component in-phase with the applied low frequency signal is detected. By controlling the substrate bias voltage of optical waveguide A so as to minimize the low-frequency component, independently from optical waveguide B, the modulation index of the optical modulator can be controlled to 100%. In place of synchronous detection of the low-frequency component under application of a low-frequency signal, the substrate bias voltage of optical waveguide A may be controlled such that the average light intensity (or the average output power level) becomes the maximum by monitoring the average intensity of the I/Q combined light.

<Control For Other Parameters>

During feedback control of the substrate bias voltage, the amplitude of a drive signal (which may be referred to as the "driving amplitude") for driving the I-arm modulator 12I and the Q-arm modulator 12Q may be set to a fixed value. In order to maintain the driving amplitude at a fixed value, the amplitude of the output light signal may be monitored for feedback control, or feed-forward control may be performed with respect to variation in the temperature or the power supply source.

Optical-phase bias voltage may be controlled as follows. In a phase modulation scheme, optical-phase bias voltage is controlled such that the center of the amplitude of a drive signal comes to a position at which the intensity of the driving voltage to light intensity characteristic curve becomes the minimum. By slightly modulating the optical-phase bias voltage using a low-frequency signal and by controlling the bias voltage such that the low-frequency component contained in the I/Q combined light becomes the minimum or zero, the optical-phase bias voltage can be set to the desired level.

In π/2 shift bias control, a static phase difference between the I-arm modulator 12I and the Q-arm modulator 12Q is controlled to be π/2 radians. The π/2 shift bias voltage is slightly modulated by a low-frequency signal, and the bias voltage is controlled so as to minimize the alternating current component in the output light of the optical modulator, as in the substrate bias control for optical waveguide B. To minimize the alternating current component, the bias voltage is controlled such that the low-frequency component contained in the I/Q combined light becomes zero or the minimum.

Using the same low-frequency signal, I-arm substrate bias control for optical waveguide A, I-arm substrate bias control for optical waveguide B, Q-arm substrate bias control for optical waveguide A, Q-arm substrate bias control for optical waveguide B, I-arm optical-phase bias control, Q-arm optical-phase bias control, and π/2 shift bias control may be performed in time-sharing manner. Time-sharing control is advantageous from the viewpoint of reducing the circuit size.

Although in the first embodiment a low-frequency signal is superimposed on the substrate bias voltage, the low-frequency signal may be superimposed on a drive signal. The same advantageous effect can be achieved.

Stable phase modulation with 0 to π phase shift can be performed even if the amount of phase rotation of light changes because of change in the input wavelength or the voltage-to-phase characteristic of an optical modulator, fluctuation of driving amplitude due to temperature change, or change with time.

Second Embodiment

In the first embodiment, linear monitoring result is fed back to substrate bias control for optical waveguide A, while feeding power monitoring result back to substrate bias control for waveguide B, with a fixed driving amplitude.

In the second embodiment, linear monitoring result is fed back to driving amplitude control for optical waveguide A, while feeding power monitoring result back to driving amplitude control for optical waveguide B. The substrate bias voltage is set to a predetermined level according to the wavelength of input light.

Figure 7:
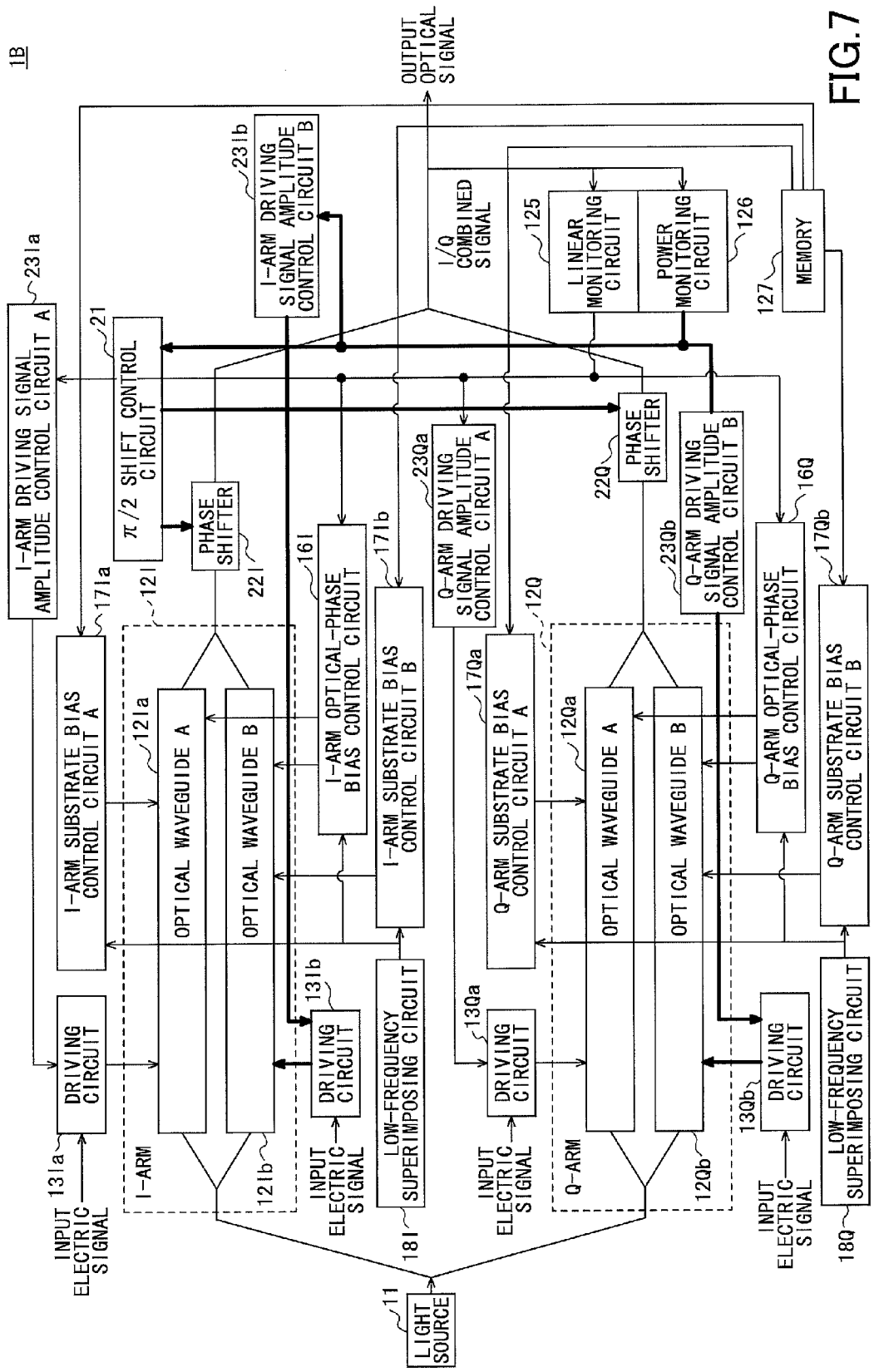
FIG. 7 is a schematic diagram of an optical transmitter according to the second embodiment.

FIG. 7 is a schematic diagram of an optical transmitter 1B, which is an example of an optical communication device according to the second embodiment. The structural elements the same as those in the optical transmitter 1A of the first embodiment are denoted by the same reference symbols and redundant explanation will be omitted. The optical transmitter 1A has I-arm driving amplitude control 23Ia and 23Ib, and Q-arm driving amplitude control circuits 23Qa and 23Qb, and a memory 127, in addition to the structure of the first embodiment.

The I-arm driving amplitude control circuit 23Ia controls the amplitude of a drive signal input to optical waveguide A of the I-arm modulator 12I. The I-arm driving amplitude control circuit 23Ib controls the amplitude of a drive signal input to optical waveguide B of the I-arm modulator 12I. The Q-arm driving amplitude control circuit 23Qa controls the amplitude of a drive signal input to optical waveguide A of the Q-arm modulator 12Q. The Q-arm driving amplitude control circuit 23Qb controls the amplitude of a drive signal input to optical waveguide B of the Q-arm modulator 12Q.

The output of the power monitoring circuit 126 is connected to inputs of the I-arm driving amplitude control circuit 23Ib and the Q-arm driving amplitude control circuit 23Qb. The I-arm driving amplitude control circuit 23Ib and the Q-arm driving amplitude control circuit 23Qb regulate the amplitude of drive signals applied to optical waveguides B so as to reduce the low-frequency component contained in the I/Q combined light to the minimum or zero. Under this control, the modulation indexes of optical waveguide A and optical waveguide B can be in conformity with each other, minimizing variation between the two waveguide, even if the characteristics of the two waveguides fluctuate in a different degree due to change with time or other factors.

The output of the linear monitoring circuit 125 is connected to inputs of the I-arm driving amplitude control circuit 23Ia and the Q-arm driving amplitude control circuit 23Qa. The I-arm driving amplitude control circuit 23Ia and the Q-arm driving amplitude control 23Qa regulate the amplitude of drive signals applied to optical waveguides A so as to reduce the low-frequency component contained in the I/Q combined light to the minimum or zero. Under this control, the modulation index of the optical modulator can be maintained at 100% even if the driving amplitudes fluctuate.

The optical transmitter 1B is used for WDM communications and the driving amplitude is adjusted according to the wavelength. In view of the capability of the driving circuits 13, it is unrealistic to perform wavelength-responsive control at the driving circuits 13. Accordingly, wavelength dependency of half-wavelength voltage Vπ (required to change the intensity of the output light between the maximum and the minimum) is compensated for by selecting an appropriate substrate bias voltage corresponding to the wavelength. On the other hand, since variation between the two waveguides or deviation in the modulation index due to change with time is very small, such variations can be compensated for by the above-described feedback control for the driving amplitude.

The memory 127 stores information about appropriate substrate bias voltage values corresponding to wavelengths. The I-arm substrate bias control circuits 17Ia and 17Ib and the Q-arm substrate bias control circuits 17Qa and 17Qb read the substrate bias voltage associated with the target wavelength out of the memory 127, and apply the substrate bias voltage at the readout level to the associate waveguides 12Ia, 12Ib, 12Qa and 12Qb, respectively.

Using the same low-frequency signal, I-arm driving amplitude control for optical waveguide A, I-arm driving amplitude control for optical waveguide B, Q-arm driving amplitude control for optical waveguide A, Q-arm driving amplitude control for optical waveguide B, I-arm optical-phase bias control, Q-arm optical-phase bias control, and π/2 shift bias control may be performed in time-sharing manner. Time-sharing control is advantageous from the viewpoint of reducing the circuit size.

Third Embodiment

Figure 8:
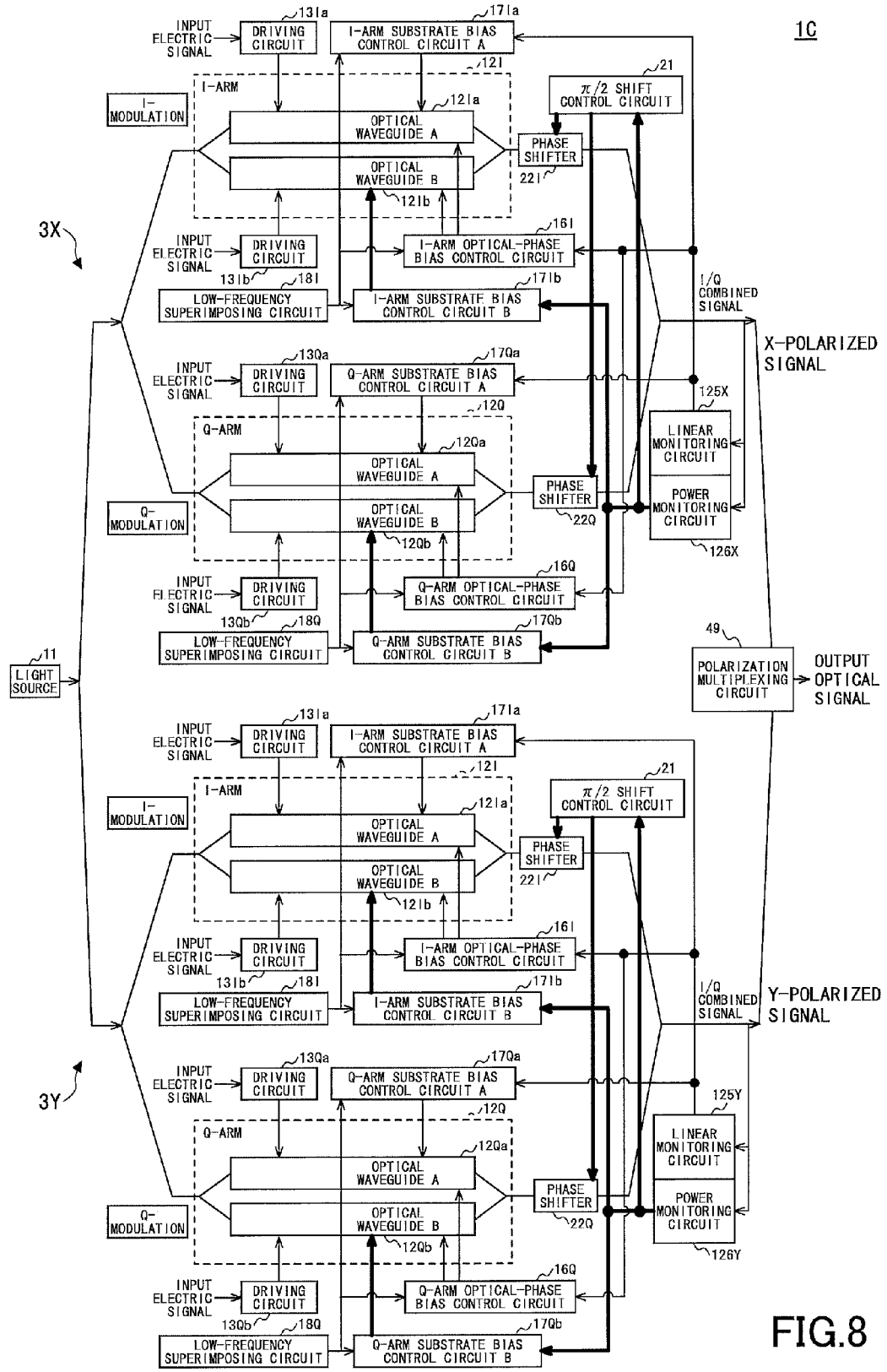
FIG. 8 is a schematic diagram of an optical transmitter according to the third embodiment.

FIG. 8 is a schematic diagram of an optical transmitter 1C, which is an example of an optical communication device according to the third embodiment. In the third embodiment, independent control for the two waveguides of a Mach-Zehnder interferometer is applied to DP-QPSK. In the following description, the substrate bias voltages for the two waveguide of each of optical modulators 12 are controlled independently as in the first embodiment. However, the invention is not limited to this example, and the driving amplitudes for the two waveguides may be independently controlled as in the second embodiment.

The light emitted from the light source 11 is split into two paths and guided to an X-polarization modulation block 3X and Y-polarization modulation block 3Y. In each of the modulation blocks 3X and 3Y, the light beam is further split into two paths and input to an I-arm Mach-Zehnder optical modulator 12I and a Q-arm Mach-Zehnder optical modulator 12Q. The configurations of the X-polarization modulation block 3X and the Y-polarization modulation block 3Y are the same as that of the modulation block for QPSK illustrated in FIG. 1, and the redundant explanation is omitted.

Linear monitoring circuits 125X and 125Y are provided for the X-polarization block 3X and the Y-polarization block 3Y, respectively. In each of the polarization blocks, the substrate bias voltage for optical waveguide A is controlled so as to maximize the intensity of the output light. Power monitoring circuits 126X and 126Y are provided for the X-polarization block 3X and the Y-polarization block 3Y, respectively. In each of the polarization blocks, the substrate bias voltage for optical waveguide B is controlled so as to minimize the alternating current component contained in the output light. The X-polarized modulated signal and the Y-polarized modulated signal are combined at a polarization multiplexing circuit 49, and outputted as an optical transmission signal.

With this arrangement, the modulation index can be set to 100% at both the X-polarization block 3X and the Y-polarization block 3Yinear monitoring circuits 125X and 125Y.

Even if variability occurs among the driving amplitudes or optical waveguides, or even if the driving circuits or the optical waveguides undergo different change with time, high-quality DP-QPSK optical signals can be produced.

Fourth Embodiment

Figure 9:
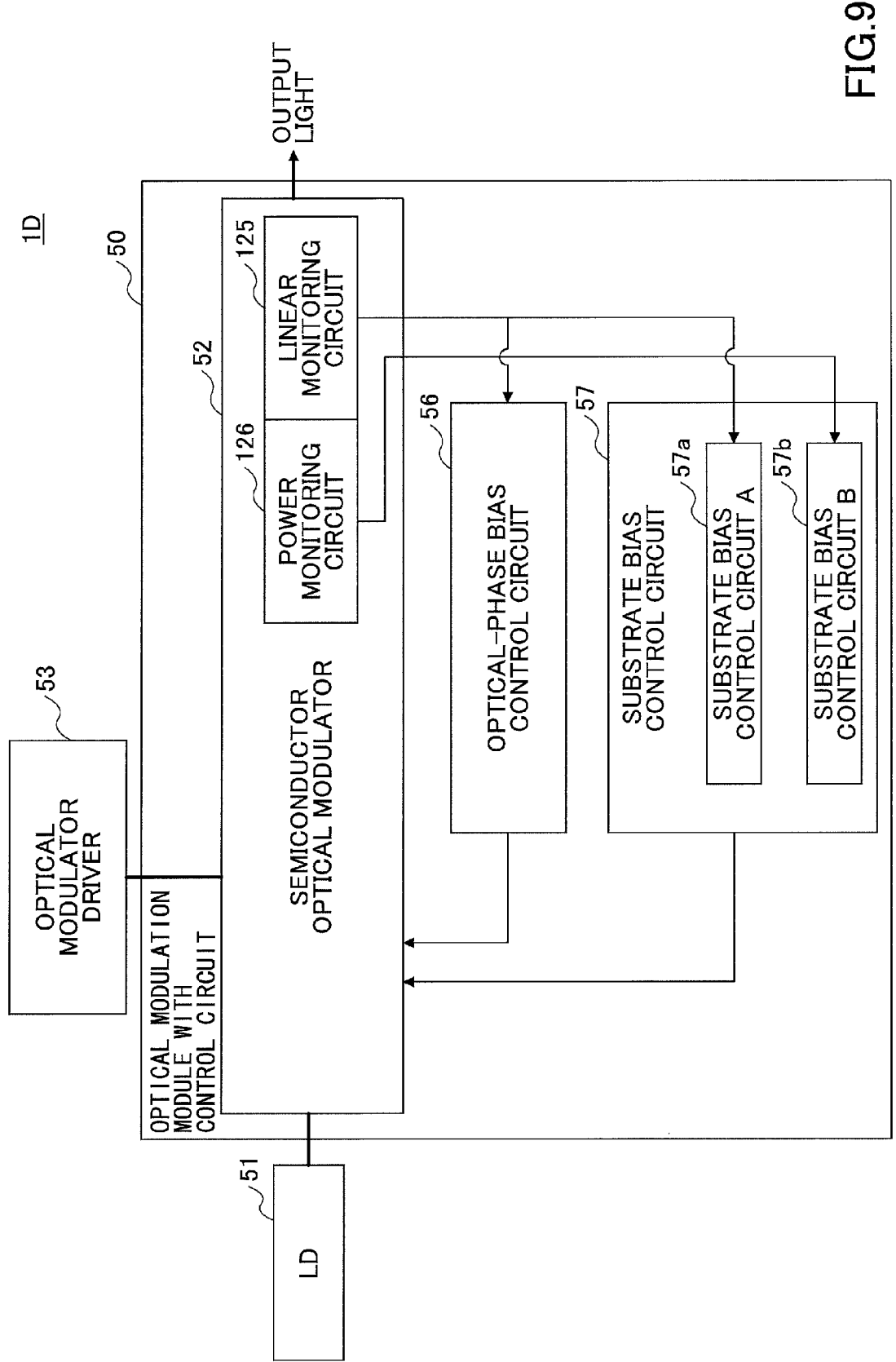
FIG. 9 is a schematic diagram of an optical transmitter according to the fourth embodiment.

FIG. 9 is a schematic diagram of an optical transmitter 1D, which is an example of an optical communication device, according to the fourth embodiment. The optical transmitter 1D has a laser diode (LD) 51 used as a light source, an optical modulation module 50, and an optical modulator driver 53. In the optical transmitter 1D, a semiconductor optical modulator 52 with a linear monitoring circuit 125 and a power monitoring circuit 126, an optical-phase bias control circuit 56, and a substrate bias control circuit 57 are accommodated in an optical modulation module 50. The substrate bias control circuit 57 has a substrate bias control circuit A (57a) and a substrate bias control circuit B (57b), which circuits are configured to independently control the substrate bias voltages applied to the optical waveguide A and the optical waveguides B. A low-frequency superimposing circuit (not illustrated in this figure) may be included in the substrate bias control circuit 57.

Although in this example the optical modulation module 50 is designed based upon the structure of FIG. 1, the DP-QPSK optical modulation blocks of FIG. 8 may be provided in the optical modulation module 50. In either case, the substrate bias voltages for two waveguide of a Mach-Zehnder interferometer are controlled independently. Optical modulation with a consistent quality and the maximum modulation efficiency can be achieved.

Fifth Embodiment

Figure 10:
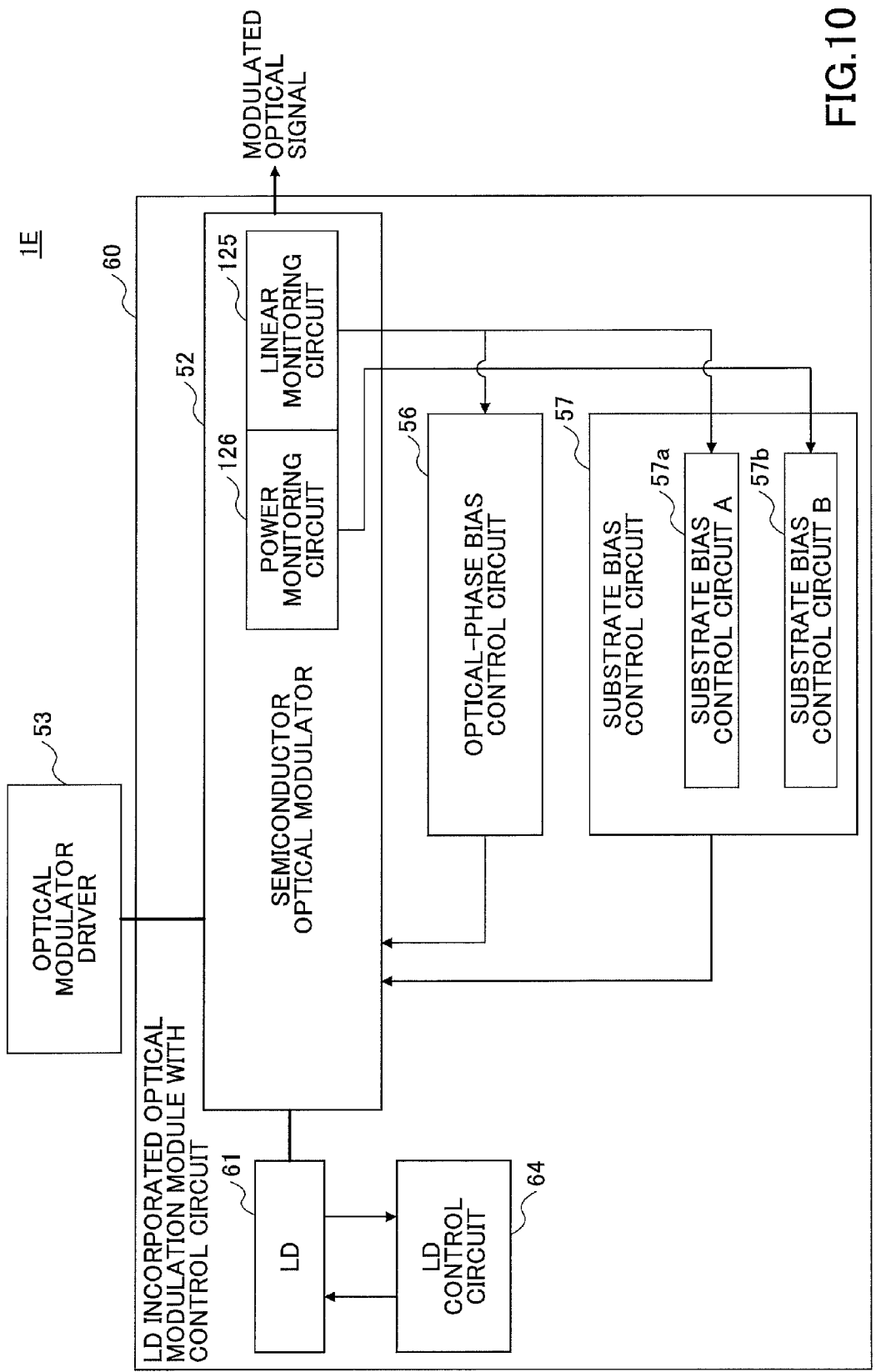
FIG. 10 is a schematic diagram of an optical transmitter according to the fifth embodiment.

FIG. 10 is a schematic diagram of an optical transmitter 1E, which is an example of an optical communication device, according to the fifth embodiment. The optical transmitter 1E has an optical modulation module 60 of a light source built-in type and an optical modulator driver 53. The same elements as those in FIG. 9 are denoted by the same reference symbols and redundant explanation is omitted.

In the optical transmitter 1E, a semiconductor optical modulator 52 with a linear monitoring circuit 125 and a power monitoring circuit 126, an optical-phase bias control circuit 56, a substrate bias control circuit 57, a light source (LD) 61, and a light source (LD) control circuit 64 are accommodated in an optical modulation module 60. This configuration implements the optical modulation module 60 with a built-in light source unit including the light source 61 and the light source control circuit 64.

Although in this example the optical modulation module 60 is designed based upon the structure of FIG. 1, the DP-QPSK optical modulation blocks of FIG. 8 may be provided in the optical modulation module 60.

Sixth Embodiment

Figure 11:
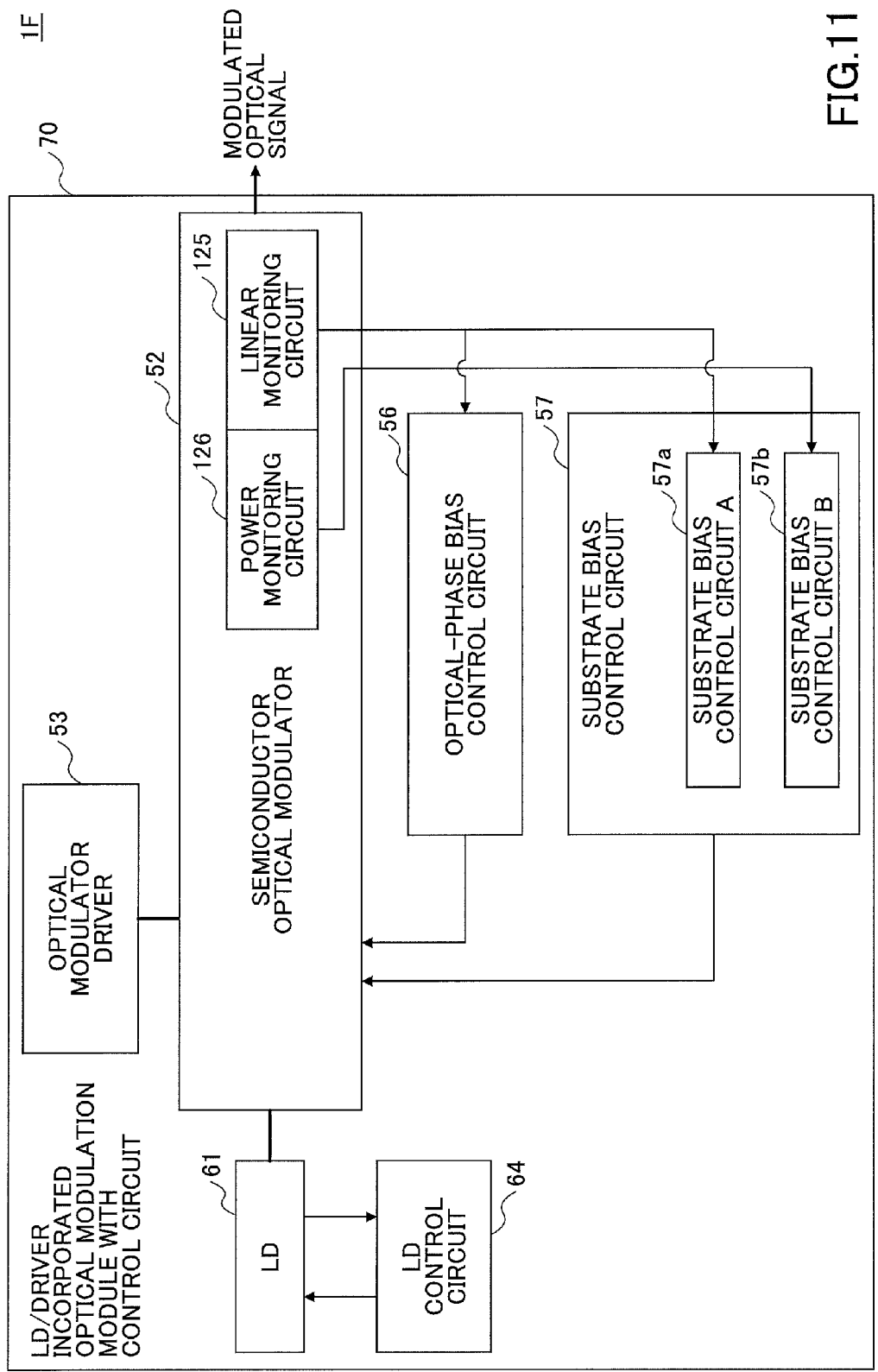
FIG. 11 is a schematic diagram of an optical transmitter according to the sixth embodiment.

FIG. 11 is a schematic diagram of an optical transmitter 1F, which is an example of an optical communication device, according to the sixth embodiment. The optical transmitter 1E has an optical modulation module 70 of a light source and driver built-in type. The same elements as those in FIG. 9 and FIG. 10 are denoted by the same reference symbols and redundant explanation is omitted.

In the optical transmitter 1F, a semiconductor optical modulator 52 with a linear monitoring circuit 125 and a power monitoring circuit 126, an optical-phase bias control circuit 56, a substrate bias control circuit 57, a light source (LD) 61, a light source (LD) control circuit 64, and an optical modulator driver 53 are accommodated in an optical modulation module 70.

Although in this example the optical modulation module 70 is designed based upon the structure of FIG. 1, the DP-QPSK optical modulation blocks of FIG. 8 may be provided in the optical modulation module 70. The driving amplitude control circuits illustrated in FIG. 7 may be accommodated in the optical modulation module 70. However, the configuration of controlling substrate bias voltage illustrated in FIG.1 or FIG. 8 is more advantageous from the view point of maintaining the module size as small as possible.

Hence, a compact single-module optical transmitter 1E capable of performing optical modulation with a consistent quality and the maximum modulation efficiency can be achieved.

Seventh Embodiment

Figure 12:
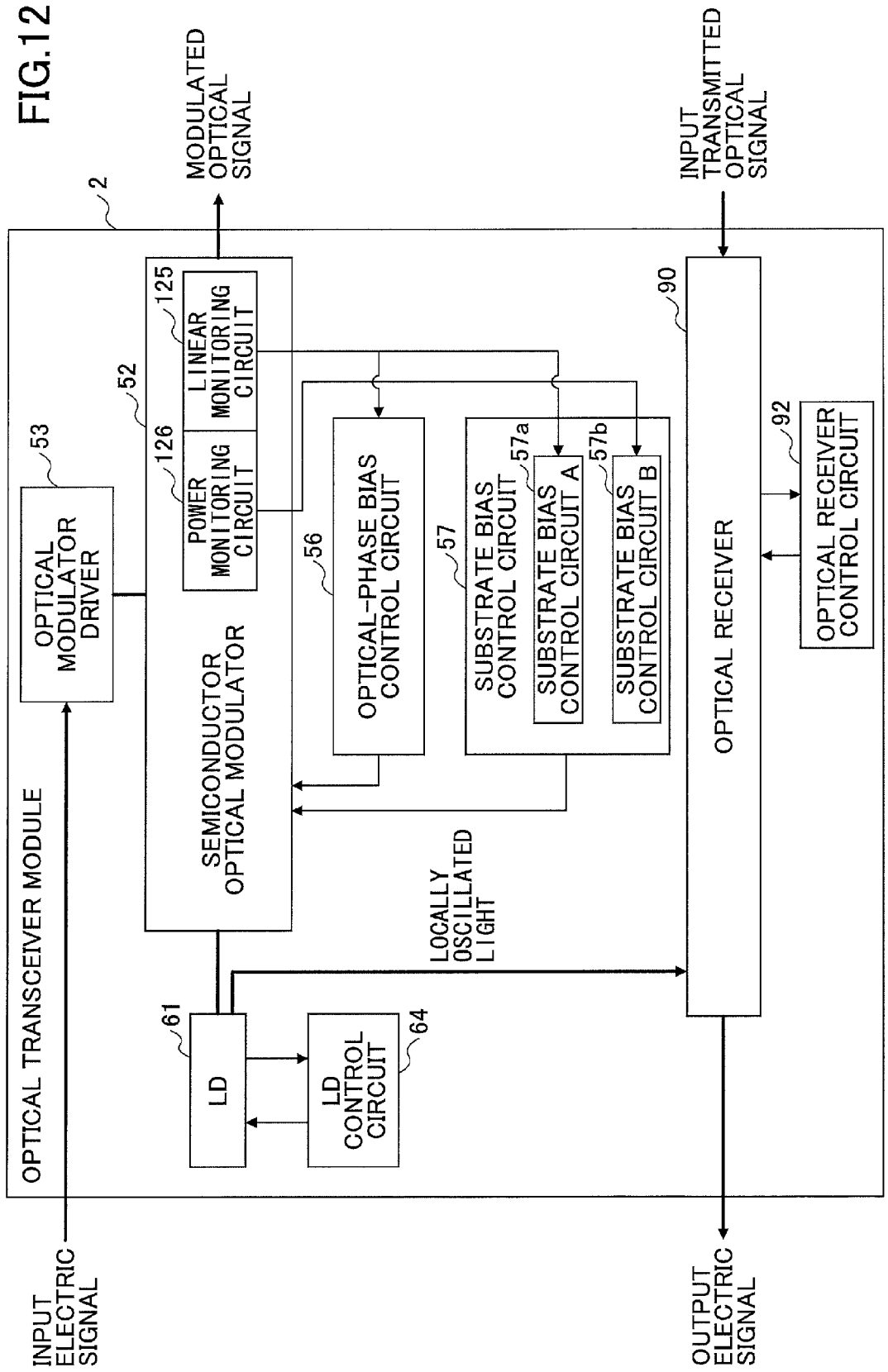
FIG. 12 is a schematic diagram of an optical transceiver according to the seventh embodiment.

FIG. 12 is a schematic diagram of an optical transceiver 2, which is an example of an optical communication device, according to the seventh embodiment. In the optical transceiver 2, a transmission system and a receiving system are accommodated in an optical transceiver module. The transmission system includes a semiconductor optical modulator 52 with a linear monitoring circuit 125 and a power monitoring circuit 126, an optical modulator driver 53, a light source unit, and a bias control unit. The light source unit includes a light source (LD) 61 and a light source (LD) control circuit 64. The bias control unit includes an optical-phase bias control circuit 56 and a substrate bias control circuit 57. The substrate bias control circuit 57 has a substrate bias control circuit 57a and a substrate bias control circuit 57b, which circuits carry out substrate bias control for optical waveguide A and optical waveguide B independently.

The receiving system includes an optical receiver 90 and an optical receiver control circuit 92. A portion of the light beam output from the LD 61 is branched and input as a local oscillation light to the optical receiver 90. The optical receiver 90 mixes the received light signal with the local oscillation light to perform coherent light detection. The detected light is subjected to optical-to-electric conversion and current-to-voltage conversion, and an electric signal is output from the optical receiver 60. This configuration implements a compact optical transceiver frontend module.

Although in this example the transmission system of the optical transceiver module 70 is designed based upon the structure of FIG. 1 (the first embodiment), the DP-QPSK optical transmitter of FIG. 8 may be used in the optical transceiver 2. The driving amplitude control circuits illustrated in FIG. 7 may be accommodated in the optical transmitter module.

In the first through the seventh embodiments, a low-frequency signal is superimposed on the substrate bias voltage. However, the low-frequency signal may be superimposed on a drive signal for driving the optical modulator 12 to independently control the substrate bias voltages for optical waveguide A and optical waveguide B.

Throughout the embodiments, the modulation indexes of two waveguides may be first brought to be consistent to each other by power monitoring and control, and then the modulation index may be set to 100% by voltage (or linear) monitoring and control. Alternatively, the modulation index of one of the two waveguide may be first controlled to 100% by voltage monitoring and control, and then the modulation index of the other waveguide may be brought to 100% so as to be consistent with said one of the waveguide by power monitoring and control.

The structures of the above-described embodiments are not limited to InP Mach-Zehnder optical modulators. All embodiments are applicable to an arbitrary Mach-Zehnder optical modulator with a pair of waveguides in which a phase rotation of light with respect to a voltage is controlled by a bias voltage. The structures of the embodiments are also applicable to a Mach-Zehnder optical modulator making use of the electrooptic effect as long as variation or different degrees of degradation may occur between two waveguides due to fluctuation in the driving circuits or different changes with time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical communication device comprising:
a pair of Mach-Zehnder optical modulators;
a voltage monitor configured to monitor a voltage component acquired by optical-to-electric conversion of combined light output from the Mach-Zehnder optical modulators;
a power monitor configured to monitor a power component acquired by square law detection of the optical-to-electric converted combined light from the Mach-Zehnder optical modulators;
a first controller configured to control a substrate bias voltage or a driving amplitude applied to one of two waveguides of each of the Mach-Zehnder optical modulators so as to minimize an alternating current component in the combined light based upon a monitoring result of the power monitor, and
a second controller configured to control the substrate bias voltage or the driving amplitude applied to another of the two waveguides of each of the Mach-Zehnder optical modulators so as to maximize intensity of the combined light based upon a monitoring result of the voltage monitor.

2. The optical communication device according to claim 1,
wherein the first controller is configured to control the driving amplitude of said one of the two waveguides based upon the monitoring result of the power monitor, and set the substrate bias voltage of said one of the two waveguides to a predetermined value in accordance with a wavelength of input light, and
wherein the second controller is configured to control the driving amplitude of said other of the two waveguides based upon the monitoring result of the voltage monitor, and set the substrate bias voltage of said other of the two waveguides to a predetermined value in accordance with the wavelength of the input light.

3. The optical communication device according to claim 1, wherein
the first controller is configured to control the substrate bias voltage of said one of the two waveguides based upon the monitoring result of the power monitor, and set the driving amplitude of said one of the two waveguides to a fixed value, and
wherein the second controller is configured to control the substrate bias voltage of said other of the two waveguides based upon the monitoring result of the voltage monitor, and set the driving amplitude of said other of the two waveguides to a fixed value.

4. The optical communication device according to claim 1, further comprising:
a low frequency generator configured to superimpose a low frequency signal on the substrate bias voltage or a drive signal to be applied to the two waveguides of each of the Mach-Zehnder optical modulators,
wherein the first controller is configured to control the substrate bias voltage or the driving amplitude of said one of the two waveguides so as to minimize a low frequency component contained in the combined light, and
wherein the second controller is configured to control the substrate bias voltage or the driving amplitude of said other of the two waveguides to as to minimize the low frequency component contained in the combined light.

5. The optical communication device according to claim 2, further comprising:
a low frequency generator configured to superimpose a low frequency signal on the substrate bias voltage or a drive signal to be applied to the two waveguides of each of the Mach-Zehnder optical modulators,
wherein the first controller is configured to control the driving amplitude of said one of the two waveguides so as to minimize a low frequency component contained in the combined light and set the substrate bias voltage of said one of the two waveguides to a predetermined value in accordance with a wavelength of input light, and
wherein the second controller is configured to control the driving amplitude of said other of the two waveguides so as to minimize the low frequency component contained in the combined light and set the substrate bias voltage of said other of the two waveguides to a predetermined value in accordance with the wavelength of the input light.

6. The optical communication device according to claim 3, further comprising:
a low frequency generator configured to superimpose a low frequency signal on the substrate bias voltage or a drive signal to be applied to the two waveguides of each of the Mach-Zehnder optical modulators,
wherein the first controller is configured to control the substrate bias voltage of said one of the two waveguides so as to minimize a low frequency component contained in the combined light and set the driving amplitude of said one of the two waveguides to the fixed value, and
wherein the second controller is configured to control the substrate bias voltage of said other of the two waveguides so as to minimize the low frequency component contained in the combined light and set the driving amplitude of said other of the two waveguides to the fixed value.

7. The optical communication device according to claim 1, wherein the Mach-Zehnder optical modulator is a Mach-Zehnder semiconductor optical modulator.

8. A method of controlling an optical modulator, comprising:
- combining light beams output from a pair of Mach-Zehnder optical modulators;
- monitoring a voltage component of combined light acquired by optical-to-electric conversion of the combined light;
- monitoring a power component acquired by square-law detection of the combined light;
- controlling a substrate bias voltage or a driving amplitude applied to one of two waveguides of each of the Mach-Zehnder optical modulators so as to minimize an alternating current component of the combined light based upon a monitoring result of the power component; and
- controlling the substrate bias voltage or the driving amplitude applied to another of the two waveguides of each of the Mach-Zehnder optical modulators so as to maximize intensity of the combined light based upon a monitoring result of the voltage monitor.

* * * * *